US010424217B1

(12) United States Patent
Sheehan

(10) Patent No.: US 10,424,217 B1
(45) Date of Patent: Sep. 24, 2019

(54) SYSTEMS AND METHODS FOR ABILITY-APPROPRIATE TEXT GENERATION

(71) Applicant: Educational Testing Service, Princeton, NJ (US)

(72) Inventor: Kathleen M. Sheehan, Skillman, NJ (US)

(73) Assignee: Educational Testing Service, Princeton, NJ (US)

(*) Notice: Subject to any disclaimer, the term of this patent is extended or adjusted under 35 U.S.C. 154(b) by 57 days.

(21) Appl. No.: 15/378,591

(22) Filed: Dec. 14, 2016

Related U.S. Application Data

(60) Provisional application No. 62/270,691, filed on Dec. 22, 2015.

(51) Int. Cl.

| | |
|---|---|
| ***G09B 7/02*** | (2006.01) |
| ***G09B 17/00*** | (2006.01) |
| ***G09B 7/04*** | (2006.01) |
| ***G09B 7/08*** | (2006.01) |
| ***G09B 7/00*** | (2006.01) |
| ***G09B 7/07*** | (2006.01) |
| ***G09B 7/06*** | (2006.01) |
| *A63F 13/67* | (2014.01) |
| *G06F 11/34* | (2006.01) |

(52) U.S. Cl.
CPC ............. *G09B 17/003* (2013.01); *G09B 7/00* (2013.01); *G09B 7/02* (2013.01); *G09B 7/04* (2013.01); *G09B 7/06* (2013.01); *G09B 7/07* (2013.01); *G09B 7/08* (2013.01); *G09B 17/00* (2013.01); *A63F 13/67* (2014.09); *G06F 11/3438* (2013.01)

(58) Field of Classification Search
None
See application file for complete search history.

(56) References Cited

U.S. PATENT DOCUMENTS

| | | | | |
|---|---|---|---|---|
| 2005/0186551 A1* | 8/2005 | Belov | ...................... | G09B 7/02 434/323 |
| 2009/0047648 A1* | 2/2009 | Ferreira | .................. | G09B 7/08 434/323 |

(Continued)

OTHER PUBLICATIONS

Chen, Jing, Sheehan, Kathleen; Analyzing and Comparing Reading Stimulus Materials Across the TOEFL Family of Assessments; Educational Testing Service, TOEFL iBT Research Report, RR-15-08; Jun. 2015.

(Continued)

*Primary Examiner* — Jason T Yen
(74) *Attorney, Agent, or Firm* — Jones Day

(57) ABSTRACT

Systems and methods are provided for generating texts appropriate for a reading level of an individual. An existing exam unit is accessed, wherein the existing exam unit includes a reading passage and a plurality of questions related to the reading passage. The plurality of questions are filtered based on a criterion to form a subset of questions. A first difficulty score is determined based on the reading passage. A second difficulty score is determined based on the subset of questions. A correlation between the first difficulty score and the second difficulty score is determined, and a text is generated that is appropriate for a reading level of an individual based on performance of the individual on the exam unit.

18 Claims, 13 Drawing Sheets

TEXT DIFFICULTY MODULE 210
FIRST DIFFICULTY SCORE 212
QUESTION FILTER 214
SUBSET OF QUESTIONS 216
QUESTION DIFFICULTY MODULE 218
SECOND DIFFICULTY SCORE 220
CORRELATOR 222
CONCORDANCE TABLE 224
TEXT GENERATOR 226
APPROPRIATE-LEVEL TEXT GENERATOR 202
EXAM UNIT 204
READING PASSAGE 206
QUESTION 1 208
QUESTION N 208
TEXT DATA STORE 232
EXAM SCORE 228
READING LEVEL APPROPRIATE TEXTS 230

ACCESS EXISTING EXAM UNIT 1102
FILTER QUESTIONS OF EXAM UNIT TO FORM SUBSET 1104
DETERMINE FIRST DIFFICULTY SCORE BASED ON READING PASSAGE OF EXAM UNIT 1106
DETERMINE SECOND DIFFICULTY SCORE BASED ON SUBSET OF QUESTIONS 1108
DETERMINE CORRELATION BETWEEN FIRST DIFFICULTY SCORE AND SECOND DIFFICULTY SCORE 1110
GENERATE TEXT THAT IS APPROPRIATE FOR READING LEVEL OF INDIVIDUAL BASED ON INDIVIDUAL PERFORMANCE ON EXAM 1112

(56) References Cited

U.S. PATENT DOCUMENTS

| | | | | |
|---|---|---|---|---|
| 2009/0197225 | A1* | 8/2009 | Sheehan | G09B 17/00 434/169 |
| 2013/0149681 | A1* | 6/2013 | Tinkler | G09B 7/04 434/167 |
| 2013/0224697 | A1* | 8/2013 | McCallum | G06Q 30/0251 434/178 |
| 2016/0240095 | A1* | 8/2016 | Baughman | G09B 7/00 |
| 2017/0278416 | A1* | 9/2017 | Liu | G09B 7/00 |
| 2017/0316710 | A1* | 11/2017 | Ikenaga | G09B 7/07 |

OTHER PUBLICATIONS

Dorans, Neil; Correspondences Between ACT and SAT I Scores; The College Board, Report No. 99-1; 1999.
Gorin, Joanna; Test Design with Cognition in Mind; Educational Measurement, 25(4); pp. 21-35; Winter 2006.
Gorin, Joanna, Embretson, Susan; Item Difficulty Modeling of Paragraph Comprehension Items; Applied Psychological Measurement, 30(5); pp. 394-411; Sep. 2006.
Hiebert, Elfrieda; The Common Core State Standards and Text Complexity; Teacher Librarian, 39(5); pp. 13-19; 2012.
Hiebert, Elfrieda; Meeting Standard 10 of the Common Core State Standards: How Principals Can Support Students' Reading of Complex Text; Principal Leadership, 13(5); pp. 30-33; Jan. 2013.
Hiebert, Elfrieda, Mesmer, Heidi; Upping the Ante of Text Complexity in the Common Core State Standards: Examining Its Potential Impact on Young Readers; Educational Researcher, 42(1); pp. 44-51; Jan.-Feb. 2013.
Holland, Paul, Dorans, Neil; Linking and Equating; Ch. 6, Educational Measurement, 4th Edition, R. Brennan (Ed.); Praeger Publishers: Westport, CT; pp. 187-220; 2006.
Kirsch, Irwin; The International Adult Literacy Survey (IALS): Understanding What Was Measured; Educational Testing Service, Research Report RR-01-25; Dec. 2001.
Lord, Frederic; Applications of Item Response Theory to Practical Testing Problems; Lawrence Erlbaum Associates: Hillsdale, NJ; 1980.
Messick, Samuel; Large-Scale Educational Assessment As Policy Research: Aspirations and Limitations; European Journal of Psychology of Education, 2(2); pp. 157-165; Jun. 1987.
National Governors Association Center for Best Practices & Council of Chief State School Officers; Common Core State Standards for English Language Arts & Literacy in History/Social Studies, Science, and Technical Subjects; 2010.
Nelson, Jessica, Perfetti, Charles, Liben, David, Liben, Meredith; Measures of Text Difficulty: Testing Their Predictive Value for Grade Levels and Student Performance; Student Achievement Partners; 2012.
Pommerich, Mary; Hanson, Bradley, Harris, Deborah, Sconing, James; Issues in Creating and Reporting Concordance Results Based on Equipercentile Methods; ACT Research Report No. 2000-1; Iowa City, IA; 2000.
Sheehan, Kathleen; Accounting for Linking Error When Evaluating the Performance of Automated Text Complexity Measurement Tools; Presented at the Northeaster Educational Research Association (NERA); Trumbul, CT; 2015.
Sheehan, Kathleen; Aligning TextEvaluator Scores With the Accelerated Text Complexity Guidelines Specified in the Common Core State Standards; Educational Testing Service, Research Report RR-15-21; Dec. 2015.
Sheehan, Kathleen; A Review of Evidence Presented in Support of Three Key Claims in the Validity Argument for the TextEvaluator Text Analysis Tool; Educational Testing Service, Research Report, RR-16-12; May 2016.
Sheehan, Kathleen; A Tree-Based Approach to Proficiency Scaling and Diagnostic Assessment; Journal of Educational Measurement, 34(4); pp. 333-352; Winter 1997.
Sheehan, Kathleen; Supporting Growth in Reading Competency Via Computer-Adaptive Testing in Low-Stakes Practice Environments; Presentation at the International Association for Computerized Adaptive Testing Summit; Oct. 2014.
Sheehan, Kathleen, Flor, Michael, Napolitano, Diane; A Two-Stage Approach for Generating Unbiased Estimates of Text Complexity; Proceedings of the 2nd Workshop of Natural Language Processing for Improving Textual Accessibility; pp. 49-58; Jun. 2013.
Sheehan, Kathleen, Kostin, Irene, Napolitano, Diane, Flor, Michael; TextEvaluator: Helping Teachers and Test Developers Select Texts for Use in Instruction and Assessment; The Elementary School Journal, 115(2); pp. 184-209; 2014.
Stenner, A. Jackson; Measuring Reading Comprehension with the Lexile Framework; Paper presented at the California Comparability Symposium; Oct. 1996.
Stenner, A. Jackson, Burdick, Hal, Sanford, Eleanor, Burdick, Donald; How Accurate are Lexile Text Measures; Journal of Applied Measurement, 7(3); pp. 307-322; 2006.
Stenner, A. Jackson, Burdick, H., Sanford, EE, Burdick, DS; The Lexile Framework for Reading: Technical Report; MetaMetrics, Inc.; Durham, NC; Apr. 2007.
Stenner, A. Jackson, Fisher, Jr., William; Stone, Mark, Burdick, Donald; Casual Rasch Models; Frontiers in Psychology, 4(536); pp. 1-14; Aug. 2013.
Stenner, Jack, Koons, Heather, Swartz, Carl; Re-conceptualizing the Text Complexity Demand Curve and Using Technology to Promote Growth Towards College and Career Readiness; Manuscript provided to Student Achievement Partners in partial fulfillment of work on Common Core Standards; MetaMetrics; Durham, NC; 2009.
Swartz, Carl, Burdick, Donald, Hanlon, Sean, Stenner, A. Jackson, Kyngdon, Andrew, Burdick, Harold, Smith, Malbert; Toward a Theory Relating Text Complexity, Reader Ability, and Reading Comprehension; Journal of Applied Measurement, 15(4); pp. 359-371; 2014.
Tatsuoka, Kikumi, Birenbaum, Menucha, Lewis, Charles, Sheehan, Kathleen; Proficiency Scaling Based on Conditional Probability Functions for Attributes; ETS Research Report, RR-93-50-ONR; Oct. 1993.
Wagner, Richard, Stanovich, Keith; Expertise in Reading; Ch. 7 in the Road to Excellence : The Acquisition of Expert Performance in the Arts and Sciences, Sports, and Games, ED. K.A. Ericsson; Lawrence Erlbaum: Mahwah, NJ; pp. 189-225; 1996.
Wendler, Cathy, Cline, Fred, Sanford, Ellie, Aguirre, Amber; Linking TOEFL Scores to the Lexile Measure; Educational Testing Service; 2010.

* cited by examiner

*Numbers of Items, by Type of Item, for the Original and Text Representation Samples*

| | Original Sample | | Text Representation Sample | | |
|---|---|---|---|---|---|
| Type of Item[a] | Modal Number per Passage | Total | Modal Number per Passage | Total | % Retained |
| Basic Comprehension | | | | | |
| - Vocabulary | 4 | 2,247 | 3 | 1,476 | 66 |
| - Fact | 4 | 1,996 | 3 | 1,471 | 74 |
| - Negative Fact | 1 | 763 | 1 | 539 | 73 |
| - Sentence | 1 | 423 | 1 | 325 | 77 |
| - Reference | 1 | 31 | 0 | 19 | 61 |
| - All Basic Comp. | 10 | 5,460 | 7 | 3,850 | 71 |
| Inferencing | | | | | |
| - Rhetorical | 1 | 730 | 1 | 539 | 74 |
| - Inference | 1 | 686 | 1 | 447 | 65 |
| - Insert | 1 | 566 | 1 | 402 | 71 |
| - All Inferencing | 3 | 1,982 | 2 | 1,388 | 70 |
| Reading to Learn | | | | | |
| - Prose Summary | 1 | 582 | 0 | 0 | 0 |
| All Items | 14 | 8,024 | 9 | 5,238 | 65 |

FIG. 4

| TOEFL iBT Reading Score | Expected TextEvaluator Score | Recommended Range of TextEvaluator Scores |
|---|---|---|
| 0 - 10 | varied | 500 - 840 |
| 11 | 800 | 650 - 850 |
| 12 | 820 | 670 - 870 |
| 13 | 830 | 680 - 880 |
| 14 | 860 | 710 - 910 |
| 15 | 880 | 730 - 930 |
| 16 | 910 | 760 - 960 |
| 17 | 940 | 790 - 990 |
| 18 | 980 | 830 - 1030 |
| 19 | 1010 | 860 – 1060 |
| 20 | 1060 | 910 - 1110 |
| 21 | 1100 | 950 - 1150 |
| 22 | 1150 | 1000 - 1200 |
| 23 | 1200 | 1050 - 1250 |
| 24 | 1260 | 1110 - 1310 |
| 25 | 1310 | 1160 - 1360 |
| 26 | 1380 | 1230 - 1430 |
| 27 | 1440 | 1290 - 1490 |
| 28 | 1500 | 1350 - 1550 |
| 29 | 1580 | 1430 - 1630 |
| 30 | 1600 | 1450 - 1650 |

FIG. 8

| *TextEvaluator* Score | Book |
|---|---|
| 195 | *The Stories Julian Tells*, by Ann Cameron |
| 530 | *The Lighthouse Family: The Storm*, by Cynthia Rylant |
| 590 | *M. C. Higgins the Great*, by Virginia Hamilton |
| 600 | *The Little Prince*, by Antoine de Saint-Exupery |
| 675 | *P.S. I Still Love You*, by Jenny Han |
| 680 | *Bud, Not Buddy*, by Christopher Paul Curtis |
| 680 | *Roll of Thunder, Hear My Cry*, by Mildred D. Taylor |
| 710 | *A Wrinkle in Time*, by Madeleine L'Engle |
| 710 | *Dragonwings*, by Lawrence Yep |
| 755 | *Me and Earl and the Dying Girl*, by Jesse Andrews |
| 760 | *The Secret Garden*, by Frances Hodgson Burnett |
| 760 | *Tuck Everlasting*, by Natalie Babbitt |
| 770 | *The Girl on the Train*, by Paula Hawkins |
| 845 | *Alice's Adventures in Wonderland*, by Lewis Carroll |
| 850 | *The Dark is Rising*, by Susan Cooper |
| 990 | *The Adventures of Tom Sawyer*, by Mark Twain |
| 1030 | *Little Women*, by Louisa May Alcott |

FIG. 9

| *TextEvaluator* Score | Book |
|---|---|
| 575 | *My Librarian is a Camel*, by Margriet Ruurs |
| 585 | *A Long Walk to Water*, by Linda Sue Park |
| 600 | *We are the Ship: The Story of Negro League Baseball*, by Kadir Nelson |
| 625 | *A History of US*, by Joy Hakim |
| 640 | *Quest for the Tree Kangaroo*, by Sy Montgomery |
| 670 | *Math Trek: Adventures in the Math Zone*, by Ivars Peterson |
| 725 | *Toys! Amazing Stories Behind Some Great Inventions*, by Don Wulffson |
| 819 | *I Am Malala*, by Malala Yousafzai with Patrick McCormick |
| 840 | *Harriet Tubman: Conductor on the Underground Railroad*, by Ann Petry |
| 980 | *Freedom Walkers: Story of the Montgomery Bus Boycott*, by Russell Freedman |
| 990 | *A Night to Remember*, by Walter Lord |
| 1120 | *Vincent Van Gogh: Portrait of an Artist*, by Jan Greenberg & Sandra Jordan |
| 1185 | *The Wright Brothers*, by David McCullough |
| 1200 | *The Life-Changing Magic of Tidying Up*, by Marie Kondo |
| 1205 | *And the Good News is ...*, by Dana Perino |
| 1220 | *Hard Choices*, by Hillary Clinton |
| 1300 | *Living History*, by Hillary Clinton |

FIG. 10

SYSTEMS AND METHODS FOR ABILITY-APPROPRIATE TEXT GENERATION

CROSS-REFERENCE TO RELATED APPLICATIONS

This application claims priority to U.S. Provisional Application No. 62/270,691, filed Dec. 22, 2015, the entirety of which is herein incorporated by reference.

TECHNICAL FIELD

The technology described herein relates to examination scoring and more particularly to generating reading texts at an appropriate difficulty level based on performance on an examination.

BACKGROUND

One of the best mechanisms for improving reading proficiency is practice. Whether one is learning to read in their native language or in a second or subsequent language, reading books, periodicals, or other documents improves one's reading or understanding skills. Such proficiency improvement can be accelerated when one performs such reading drilling using texts that are matched to their current reading ability.

SUMMARY

Systems and methods are provided for generating texts appropriate for a reading level of an individual. An existing exam unit is accessed, wherein the existing exam unit includes a reading passage and a plurality of questions related to the reading passage. The plurality of questions are filtered based on a criterion to form a subset of questions. A first difficulty score is determined based on the reading passage. A second difficulty score is determined based on the subset of questions. A correlation between the first difficulty score and the second difficulty score is determined, and a text is generated that is appropriate for a reading level of an individual based on performance of the individual on the exam unit.

As another example, a computer-implemented system for generating texts appropriate for a reading level of an individual includes one or more data processors and a non-transitory computer-readable medium containing instructions for commanding the one or more data processors to execute steps of a process. In the process, an existing exam unit is accessed, wherein the existing exam unit includes a reading passage and a plurality of questions related to the reading passage. The plurality of questions are filtered based on a criterion to form a subset of questions. A first difficulty score is determined based on the reading passage. A second difficulty score is determined based on the subset of questions. A correlation between the first difficulty score and the second difficulty score is determined, and a text is generated that is appropriate for a reading level of an individual based on performance of the individual on the exam unit.

As a further example, a non-transitory computer-readable medium contains instructions for commanding the one or more data processors to execute steps of a process for generating texts appropriate for a reading level of an individual. In the process, an existing exam unit is accessed, wherein the existing exam unit includes a reading passage and a plurality of questions related to the reading passage. The plurality of questions are filtered based on a criterion to form a subset of questions. A first difficulty score is determined based on the reading passage. A second difficulty score is determined based on the subset of questions. A correlation between the first difficulty score and the second difficulty score is determined, and a text is generated that is appropriate for a reading level of an individual based on performance of the individual on the exam unit.

BRIEF DESCRIPTION OF THE FIGURES

FIG. 4 indicates the numbers of items of each type included in the original item pool.

FIG. 8 depicts a concordance table estimated from the smoothed regression curve in FIG. 7.

FIGS. 9 and 10 depict sample books, with corresponding TextEvaluator scores.

DETAILED DESCRIPTION

Systems and methods as described herein provide an approach for matching readers to texts of appropriate difficulty. The approach involves establishing a link between the reading proficiency scores earned by test-takers on a passage-based reading comprehension assessment, and passage complexity estimates generated via an automated text complexity measurement tool (ATCMT).

Figure 1:
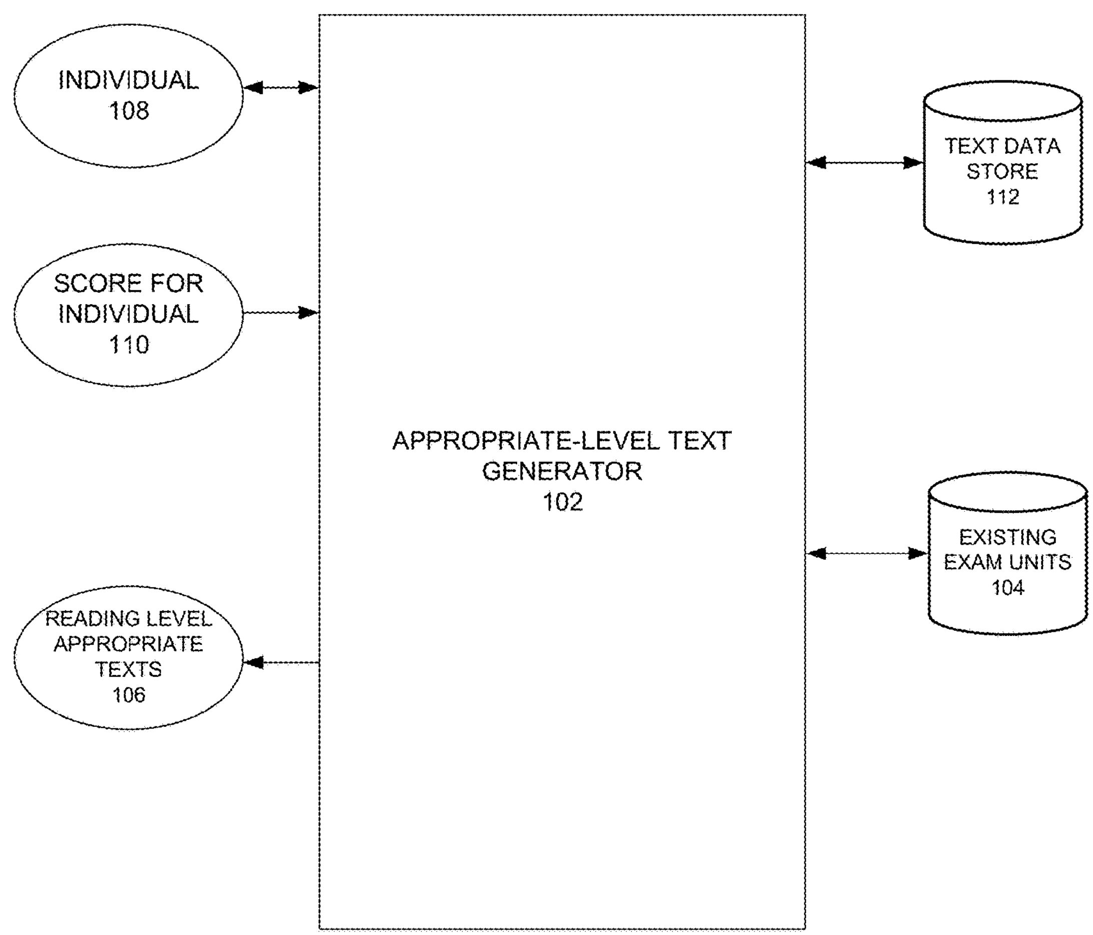
FIG. 1 is a block diagram depicting a computer-implemented appropriate-level text generator.

FIG. 1 is a block diagram depicting a computer-implemented appropriate-level text generator. An appropriate-level text generator 102 processes exercises (exam units 104) of existing exams to determine their ability to measure reading capabilities. The existing exams, typically, are not designed to measure reading capability, or those existing exams are designed to measure a variety of capabilities of an individual, beyond reading capability. For example, a Test of English as a Foreign Language (TOEFL) exam is a standardized test to measure the English language ability of non-native speakers wishing to enroll in English speaking universities. That test measures reading, listening, speaking, and writing capabilities.

The text generator 102 processes exam units 104 of a variety of forms, such as reading passage exam units 104. In a reading passage exam unit 104, an individual is asked to read a passage (e.g., a paragraph, a page, a few pages of text) and then to answer a set of questions based on that reading passage. Typically, only certain of the questions of a reading passage exam unit 104 are designed to measure skills related to reading proficiency. In one example, certain questions are designed to measure "text representation" ability, which is highly correlated with reading proficiency, where other questions are designed to measure "response decision" abilities, which are less correlated with reading proficiency. The text generator 102, in one embodiment, seeks to identify a subset of questions in the existing exam units that are likely to measure certain attributes, such as text representation. The text generator 102 evaluates the difficulty of the questions in that subset and the difficulty of the reading passage portion of the exam unit. The text generator correlates difficulty scores generated in those evaluations to create a concordance table that maps performance on the existing exam to a reading level.

Having the concordance table created, the text generator 102 can generate reading level appropriate texts 106 for an individual 108. The individual interacts with the text generator 102 directly (e.g., taking the exam via the generator 102 to receive a score) or provides a score for the exam to the generator, as indicated at 110. That exam may have some of the exam units 104 used to create the concordance table or may be a future version of the exam does not include any of the exam units 104 but includes similar exam units (e.g., exam units designed using the same or similar specification as the exam units 104 used in creating the concordance table). The generator 102 uses the concordance table to map the score 110 to a reading level for the individual 108, which indicates a measure of the individual's likely reading proficiency. The text generator 102 then generates reading level appropriate texts 106 at or near that reading level. The text generator may generate the reading level appropriate text 106 by generating the text 106 from scratch, identifying the text 106 for the individual (e.g., by name, ISBN), forwarding the text 106 to the individual (e.g., from an existing text data store 112), or providing a link to the text 106.

Figure 2:
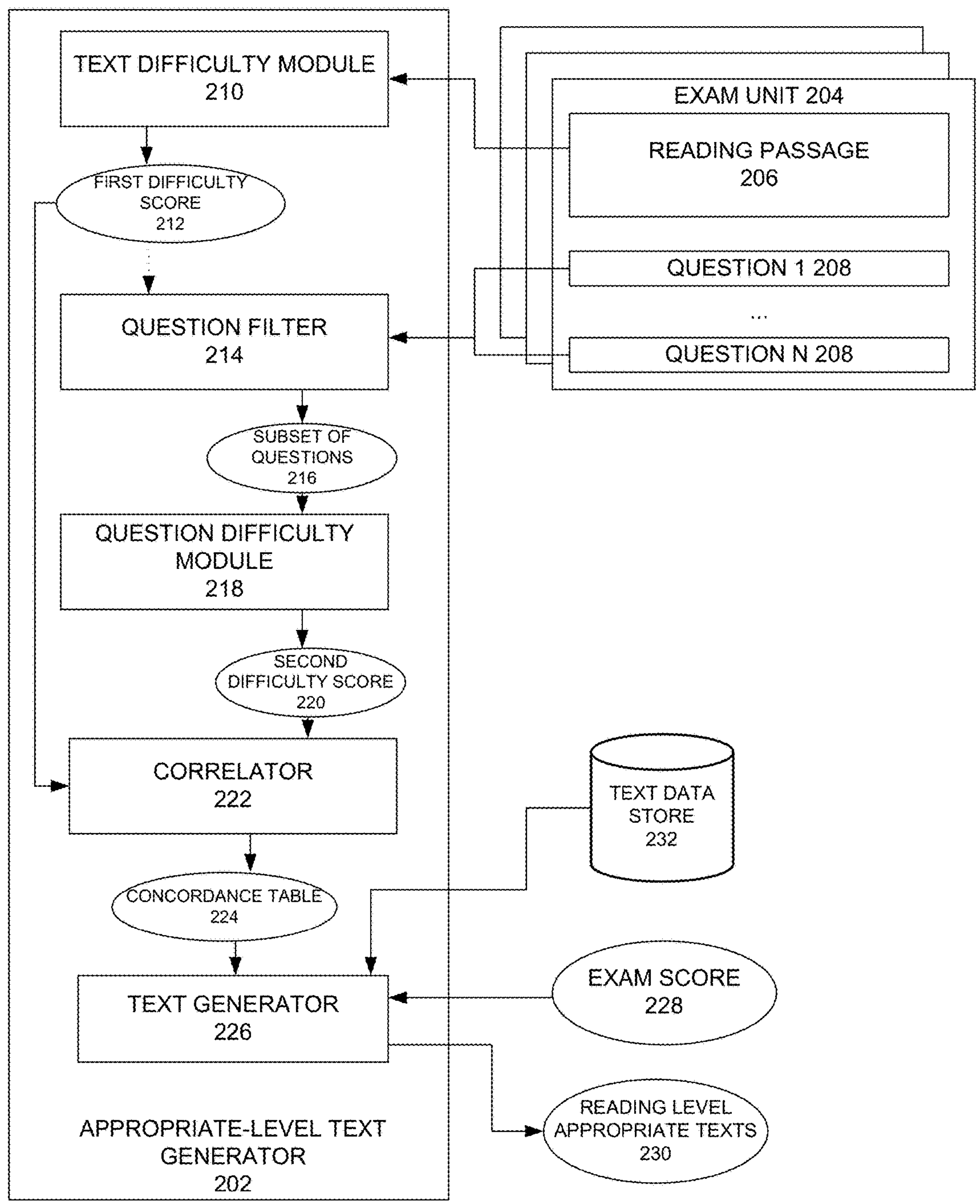
FIG. 2 is a block diagram depicting functionality of an appropriate-level text generator, in one embodiment.

FIG. 2 is a block diagram depicting functionality of an appropriate-level text generator, in one embodiment. A text generator 202 accesses an exam unit 204 of an existing exam. The exam unit 204 includes a reading passage 206 and a plurality of questions 208 related to the reading passage 206. A text difficulty module 210 determines a first difficulty score 212 based on the reading passage 206. A question filter 214 filters the plurality of questions 208 based on a criterion to form a subset of questions 216. In one embodiment, the criterion is based on the first difficulty score 212. A question difficulty module 218 determines a second difficulty score 220 based on the subset of questions 216. A correlator 222 determines a correlation between the first difficulty score 212 and the second difficulty score 220 to create a concordance table 224. A text generator module 226 receives an exam score 228 for an individual and generates and outputs one or more reading level appropriate texts 230 for the individual using the concordance table 224. For example, the text generator module 226 can be configured to identify a reading proficiency level of the individual using the concordance table 224 based on the exam score 228, where the text generator module 226 access texts from a text data store 232, which have previously been assigned a difficulty level, and outputs reading level appropriate texts 230 that are within a threshold range of the identified proficiency level of the individual.

Figure 3:
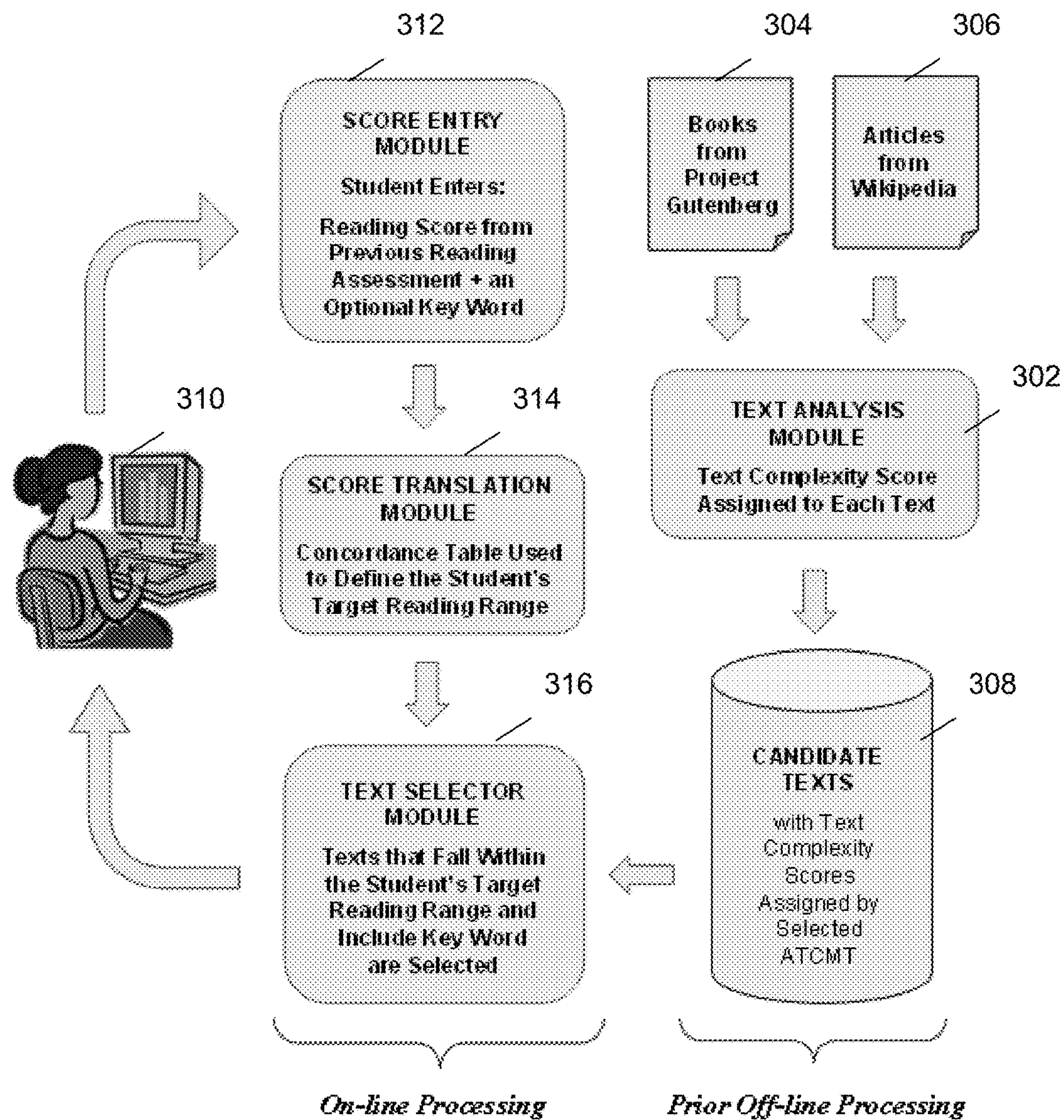
FIG. 3 is a diagram depicting operations of a text generator in providing appropriate-level texts to an individual.

FIG. 3 is a diagram depicting operations of a text generator in providing appropriate-level texts to an individual. In one embodiment, certain operations can be performed "off-line" (e.g., prior to interaction with the individual). For example, a text analysis module 302 can analyze pre-existing texts from one or more repositories 304, 306 and assign difficulty levels to those texts. The candidate texts along with their assigned difficulty scores are stored in a text data store 308. An individual 310 interacts with the text generator, entering a reading score from a previous assessment (e.g., a TOEFL exam score) along with a keyword indicating a topic of preferred reading material, as indicated at 312. A score translation module 314 uses a concordance table to define the individual's target reading range based on the entered score. A text selector module 316 searches the text data store 308 to identify texts that both fall within the individual's target reading range and which include or are associated with the keyword entered at 312.

The reader/text matching algorithm described herein can be implemented with respect to any reading assessment that includes a sufficient number of passage-based reading items, and any text complexity measurement tool (e.g., a tool that is expected to be closely aligned with the reading construct targeted by that assessment). Systems and method, in one embodiment utilize passage comprehension that is operationally defined as the reading ability needed to respond correctly to 75% of the items administered with a passage (e.g., a text is at an appropriate difficulty level where an individual can answer 75% of questions asked about that text correctly).

In one embodiment, a system first assembles a database of reading comprehension passages and questions (e.g., from existing, pre-generated exams, not affiliated with the text generator). Many reading assessments are structured such that each item is designed to simulate the types of reading tasks that students would be expected to perform in real-life reading episodes. For example, items on the TOEFL iBT reading assessment are designed to simulate the types of reading tasks that students are likely to engage in at colleges and universities in North America. The reading skills needed to respond correctly to these types of passage-based reading items have been described as encompassing two types of processes: (1) processes focused on the goal of developing a coherent mental representation of the information, argument, situation or experience presented in the passage, and (2) processes focused on the goal of applying additional verbal reasoning skills, as needed, to address additional processing demands such as clarifying the type of information requested in an item stem, or ruling out a close distractor. These categories can be referred to as two types of processes as "text representation" and "response decision."

When selecting texts that are "well-matched" to a test-taker's reading abilities systems are primarily interested in the "text representation" aspect of reading ability rather than the "response decision" aspect. Thus, certain embodiments are implemented with respect to a subset of items judged to be closely focused on the text representation aspect of comprehension. This subset is selected by starting with a large pool of passages and items, and then retaining those items that are judged to be most appropriate for use in the proposed application. As is illustrated below, item classifications developed as part of the item development process and the degree of alignment between empirical and theoretical estimates of text complexity are considered when selecting an optimal subset of items for each passage.

Next, a system generates a text complexity score ($Tc_j$) for each reading passage. In this step, an automated text complexity measurement tool (ATCMT) is used to generate an estimated text complexity score ($Tc_j$) for each passage. Although a variety of different types of automated tools could be employed at this step, resulting feedback is likely to be most accurate when the reading ability construct employed in the development of the selected tool is closely aligned with the reading ability construct targeted by the selected reading assessment.

A system then generates a reading difficulty score ($PC75_j$) for each package. Like the RP80 scores employed in some previous testing applications, the PC75 score is designed to help test users understand the types of reading skills needed to score at lower and higher levels on a reading proficiency scale. For example, In one embodiment, an RP80 score is generated for each item on the International Adult Literacy Survey (IALS) as follows. First, a 3-parameter logistic IRT model is used to model observed responses to each IALS item. Next, an item characteristic curve (ICC) is generated for each item. Each ICC provides the probability that a test-taker will respond correctly to an item expressed conditional on the test-taker's IALS reading proficiency score. Finally, an RP80 score was defined for each item by determining the reading proficiency score needed to achieve a correct response probability of at least 80%. By definition then, a test-taker with a reading proficiency score that falls below an item's RP80 score is expected to have less than an 80% chance of responding correctly to the item, while a test-taker with a reading proficiency score that falls above an item's RP80 score is expected to have an 80% to 100% chance of responding correctly to the item. Thus, the RP80 measure provides a method for distinguishing items that are likely to be more or less challenging for test-takers located at any specified point on a reading proficiency scale.

The RP80 measure is sometimes thought of as an item characteristic. In many reading assessments, however, items are clustered within passages. For example, each form of the TOEFL iBT includes a reading section comprised of 3, 4 or 5 passages, with each passage followed by 12-14 items. In order to properly address this alternative format, certain embodiments utilize an extension of the RP80 concept that is conceptualized as a passage characteristic rather than as an item characteristic. In this approach, a Passage Comprehension Curve (PCC) is generated for each passage by accumulating the correct response probabilities estimated for each retained item in each passage set. Each resulting PCC provides the probability that a test-taker will respond correctly to any of the "text representation" items presented with the passage, expressed conditional on the test-taker's reading proficiency score. A PC75 score can then be generated for each passage by solving for the reading proficiency score at which a test-taker has at least a 75% chance of responding correctly to any of the text representation items administered with the passage. A passage that is well-matched to a test-taker's reading ability can then be defined as any passage that has a PC75 score that falls within a relatively narrow interval centered about the test-taker's reading proficiency score.

Next, a system estimates the regression of text complexity scores ($Tc_j$) on passage difficulty scores ($PC75_j$). The embodiment described above analyzes passages that were administered on the specified assessment, and thus have operational IRT item parameters expressed on the same scale as a student's reading ability score. Those passages can be considered as a potential "match." Because readers may also want to read texts that were not included on the targeted reading assessment, a procedure for extending the definition of a "well-matched" text to a broader class of texts can be included.

In one embodiment, a more broadly applicable definition of a well-matched text is developed by establishing a link between passage difficulty estimates specified in terms of PC75 scores, which are available for texts that were included on the targeted assessment, and passage difficulty estimates specified via an ATCMT, which can be generated for any text. Once a link is established, then an expected PC75 score can be generated for each potential text, and a "well-matched" text can then be defined as any text that has an expected PC75 score that falls "near" the test-taker's reading proficiency score, where each expected PC75 score is expressed on the measurement scale of the selected ATCMT.

In one example, a regression technique is used to establish a link between the text complexity scores ($Tc_j$) estimated for each passage and the passage difficulty scores ($PC75_j$) estimated for each passage. In particular, a locally weighted scatter plot smoother can be used to characterize $Tc_j$ conditional on $PC75_j$. The resulting smoothed curve provides the range of text complexity scores that corresponds most closely to each possible PC75 score. A concordance table based on this relationship can then be developed. The resulting table will support inferences from a test-taker's score on the selected reading assessment to a corresponding range of text complexity scores expressed on the reporting scale of the selected ATCMT.

For example, consider a test-taker who receives a score of 20 on the TOEFL iBT reading assessment. By definition, this test-taker is expected to be well-matched to any text that has a PC75 score near 20. A concordance table generated via the approach outlined above enables translation of any PC75 score into a corresponding range of text complexity scores expressed on the reporting scale of an ATCMT, so the set of texts that are likely to be well-matched to a test-taker's current reading ability can also be specified more generally. This can expand the universe of texts that test-takers can consider.

The following is a description of an example implementation of an appropriate-level text generator. In this example, appropriate-level texts are provided to TOEFL iBT test-takers. The application is implemented with respect to the TextEvaluator$^{SM}$ service, an ATCMT designed to provide text complexity scores that are closely aligned with the reading proficiency constructs targeted by many high-stakes reading assessments, including assessments targeted at L1 (native language) readers, and assessments targeted at L2 (second language) readers.

The system uses a database of passages and items. Specifically, a database of 582 TOEFL iBT passage sets was assembled for consideration in the analysis. Each set had been included on an operational TOEFL iBT form administered between 2010 and 2015 and included between 12 and 14 items. Because item type classifications were considered at subsequent stages of the analysis, passage sets that did not include a valid type classification for each item were excluded.

TOEFL assessment developers classify each TOEFL iBT reading item as belonging to one of three main categories: (a) Basic Comprehension items, (b) Inferencing items, and (c) Reading to Learn items. Basic Comprehension items are further divided into five subtypes: Vocabulary, Fact, Negative Fact, Sentence and Reference. Each of these five subtypes is designed to assess lexical, syntactic, and semantic abilities, along with the ability to understand information presented in single sentences and to connect information across sentences.

Inferencing items differ from Basic Comprehension items in that students are also required to infer information that is not directly stated in the text, but is inferable from the information presented in the text. Items in this category belong to three subtypes: Rhetorical items, Inference items and Insert Sentence items.

Reading to Learn tasks are designed to assess additional abilities such as recognizing the organization and purpose of a text, distinguishing major from minor ideas, and understanding rhetorical functions such as the text features used by authors to establish cause and effect relationships.

Items included on the TOEFL iBT reading section also differ in terms of the number and type of options included with each item. In particular, while all of the Basic Comprehension and Inferencing items are presented with a single correct option and three incorrect options, Reading to Learn tasks are presented with more than four choices and more than one correct answer, allowing for partial-credit scores.

FIG. 4 indicates the numbers of items of each type included in the original item pool. In most cases, passages were administered with 10 Basic Comprehension items, 3 Inferencing items and one Reading to Learn item, yielding a total of 14 items for the passage, and a total of 8,024 items across all 582 passages.

Analyses focused on selecting an optimal subset of items were conducted in two steps. First, all Reading to Learn items were excluded as the difficulty parameters of these items were judged to be more heavily influenced by response selection processes than by text representation processes. Next, the item difficulty parameters obtained for each of the remaining items were compared to passage difficulty estimates generated via the TextEvaluator tool and nine closely-aligned items were selected from each passage. As is indicated in FIG. 4, most passages were then represented by 7 Basic Comprehension items and 2 Inferencing items, yielding a total of 9 items per passage, and 9×582=5,238 items across all passages.

Figure 5:
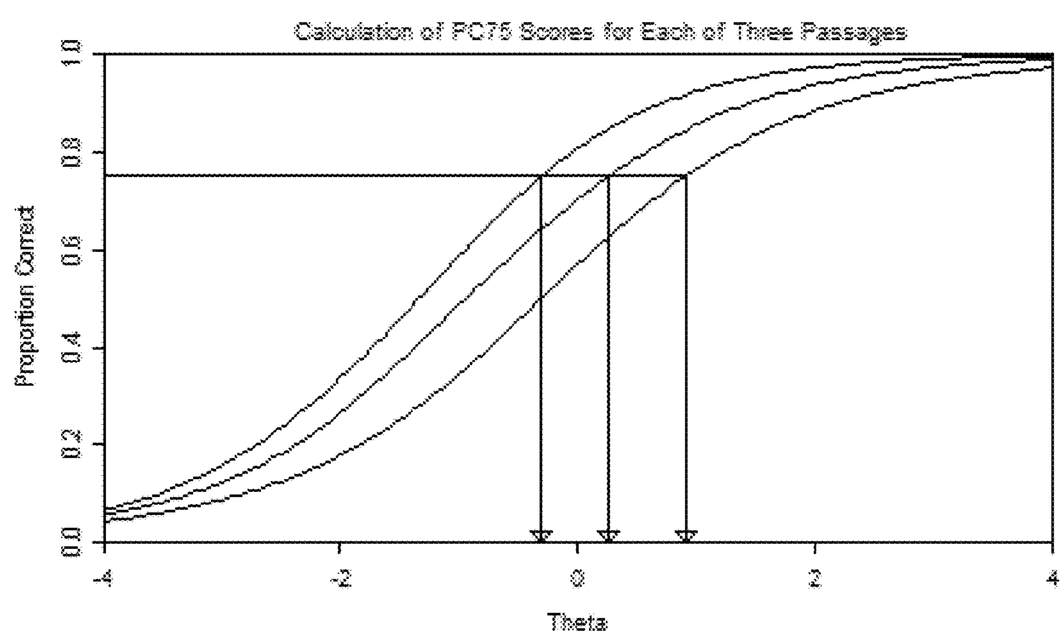
FIG. 5 is a diagram illustrating an example mechanism for generating a PC75 score for a text.

Next, a TOEFL to TextEvaluator Concordance Table was generated. Specifically, two difficulty scores were then generated for each passage: a TextEvaluator score ($Tc_j$) which is estimated entirely from observable features of the passage, and a passage difficulty score ($PC75_j$) which is estimated entirely from the IRT item parameters of the items presented with a passage. Each TextEvaluator score is obtained by first extracting more than 100 observable text features known to be indicative of comprehension ease or difficulty, and then using that evidence to infer the location of the passage on the TextEvaluator scale, a developmental scale that ranges from 100 (indicating that the text is appropriate for beginning readers) to 2000 (indicating that the text is appropriate for advanced college-level readers). By contrast, each Passage difficulty score is obtained by first generating a PCC for each passage, and then solving for the reading ability scores needed to achieve an expected proportion correct score of 0.75. FIG. 5 is a diagram illustrating an example mechanism for generating a PC75 score for a text.

Figure 6:
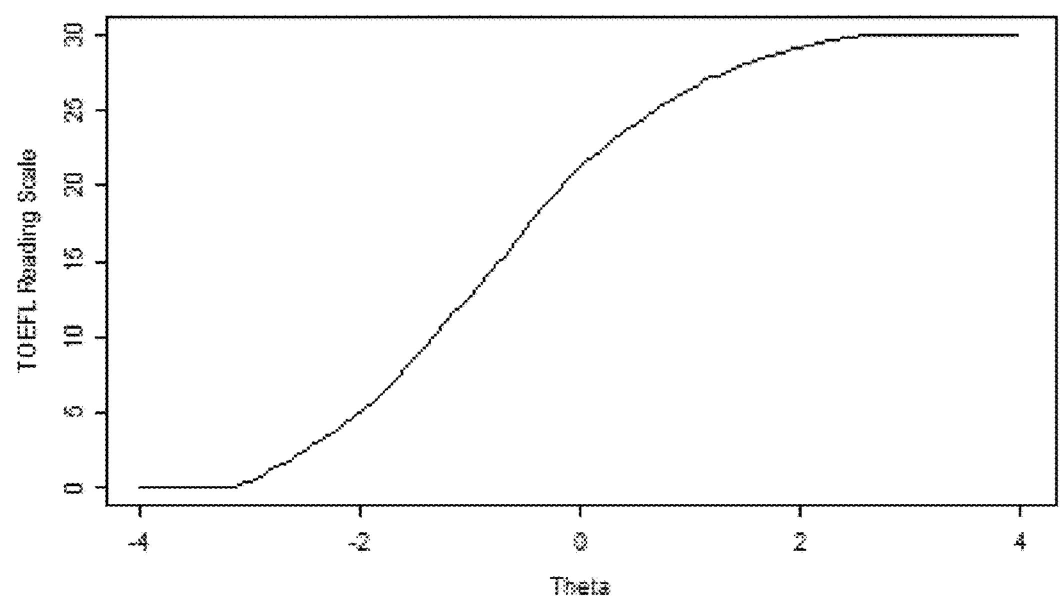
FIG. 6 is a diagram illustrating a function for use when translating from the theta scale to the TOEFL iBT reporting scale.

As is shown in FIG. 5, each PC75 score is originally expressed on the theta scale, that is, the standardized scale employed during item calibration and form assembly. When presenting assessment results to test-takers and other score users, however, it is standard practice to employ a reporting scale that does not include negative numbers. For the TOEFL iBT reading assessment the reporting scale ranges from 0 to 30. FIG. 6 is a diagram illustrating a function for use when translating from the theta scale to the TOEFL iBT reporting scale.

Figure 7:
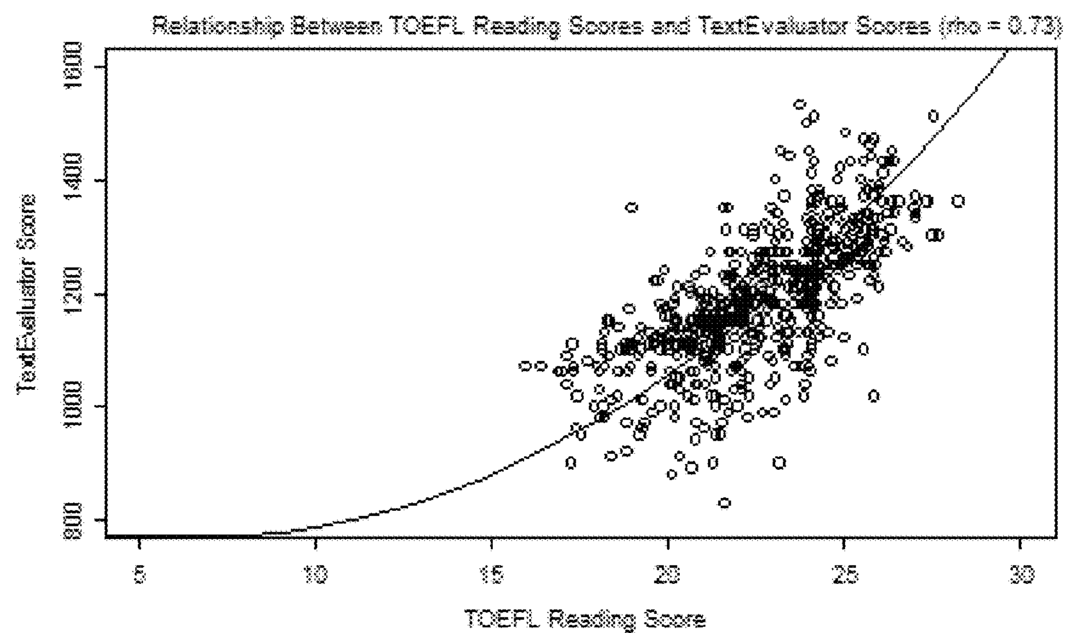
FIG. 7 is a diagram depicting the 582 score pairs employed in an analysis, along with the resulting smoothed curve.

Next, a locally weighted scatter plot smoother was used to estimate the regression of TextEvaluator scores ($Tc_j$) on passage difficulty scores ($PC75_j$). FIG. 7 is a diagram depicting the 582 score pairs employed in the analysis, along with the resulting smoothed curve. The analysis yielded an estimated standard error of 91, and a correlation of 0.73, suggesting that reading ability scores expressed on the TOEFL iBT reading scale can be reliably translated into corresponding reading ability scores expressed on the TextEvaluator scale.

FIG. 8 depicts a concordance table estimated from the smoothed regression curve in FIG. 7. The table provides an approximate 2-standard deviation "targeted reading range" expressed on the TextEvaluator scale for students with specified TOEFL iBT reading scores. For example, consider a test-taker who received a score of 20 on the TOEFL iBT reading section. The estimates in FIG. 8 suggest that this test-taker is likely to be well-matched to any text with a TextEvaluator score in the range from 910 to 1110. Practically speaking, this means that the test-taker is expected to know the meaning of many, but not all of the words presented in the texts at this range, and is also likely to be familiar with many but not all of the sentence and discourse-level structures found in such texts. Sample books, with corresponding TextEvaluator scores, are shown in FIG. 9 (fiction) and FIG. 10 (nonfiction).

Reader/text matching systems and methods described herein offer a number of potential advantages over existing approaches. First, because a separate linking test is not required, the time and expense associated with developing, administering and scoring a new reading assessment is avoided. Second, the strategy of not employing a separate linking assessment also means that the resulting concordance table will not be subject to the types of biases that may arise when linking tests are administered to self-selected samples of test-takers. Third, because the analyses consider item difficulty parameters estimated from data collected in a large number of previous test administrations, a larger, more diverse set of passages can be included in the analysis, and evidence about the difficulties experienced by test-takers when reading those passages can be based on the responses provided by a larger, more diverse set of test-takers. Fourth, the approach can be implemented with respect to any desired ATCMT, a degree of flexibility that enables users to select the most appropriate tool for each new application. For example, text complexity classifications generated via the TextEvaluator service are employed in the TOEFL application described above since TextEvaluator scores have been shown to be effective at distinguishing passages expected to be more or less challenging for younger and older TOEFL test-takers. These advantages suggest that systems and methods described herein are capable of providing accurate, actionable information about the types of texts that are expected to provide an appropriate level of reading challenge for test-takers who score at specified points on the reporting scales of a number of different standardized reading assessments.

Figure 11:
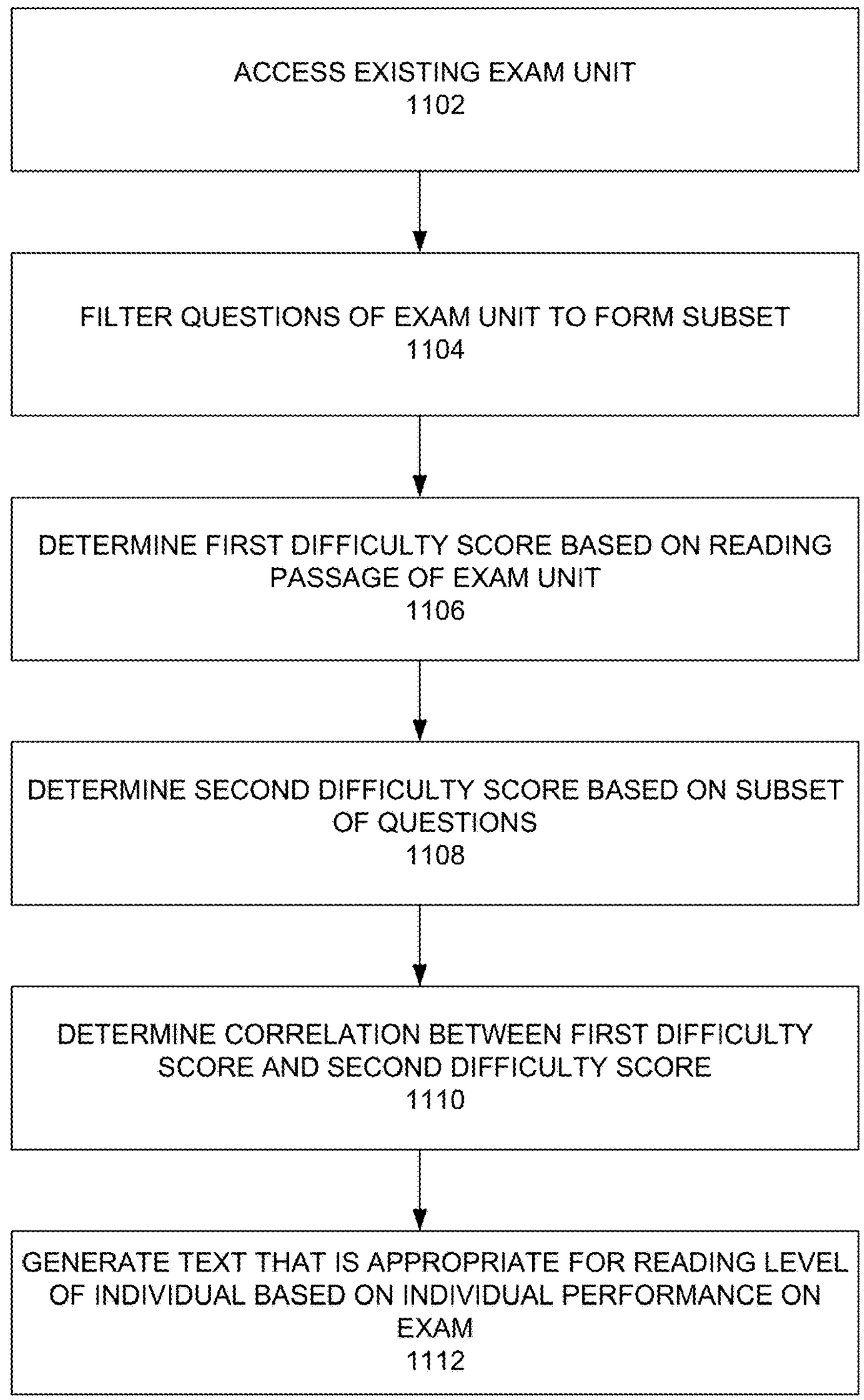
FIG. 11 is a flow diagram depicting a computer-implemented method of generating texts appropriate for a reading level of an individual.

FIG. 11 is a flow diagram depicting a computer-implemented method of generating texts appropriate for a reading level of an individual. At 1102, an existing exam unit is accessed, wherein the existing exam unit includes a reading passage and a plurality of questions related to the reading passage. The plurality of questions are filtered at 1104 based on a criterion to form a subset of questions. A first difficulty score is determined based on the reading passage at 1106. At 1108, a second difficulty score is determined based on the subset of questions. At 1110, a correlation between the first difficulty score and the second difficulty score is determined, and at 1112, a text is generated that is appropriate for a reading level of an individual based on performance of the individual on the exam unit.

Figure 12A:
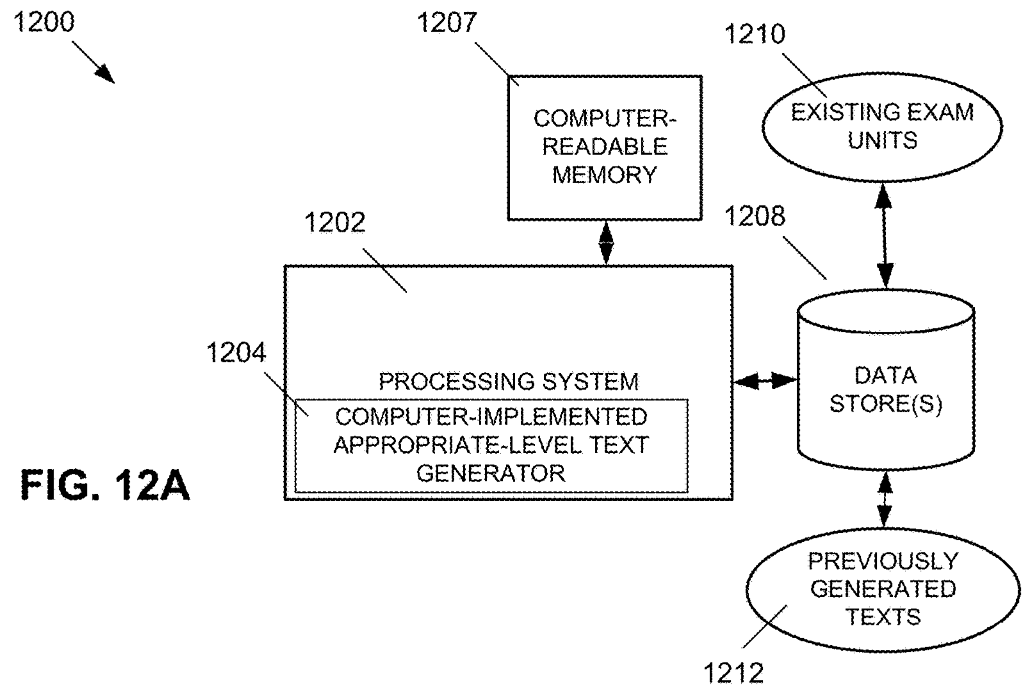
FIGS. 12A, 12B, and 12C depict example systems for implementing the approaches described herein for automatically generating texts appropriate for a reading level of an individual.
Figure 12B:
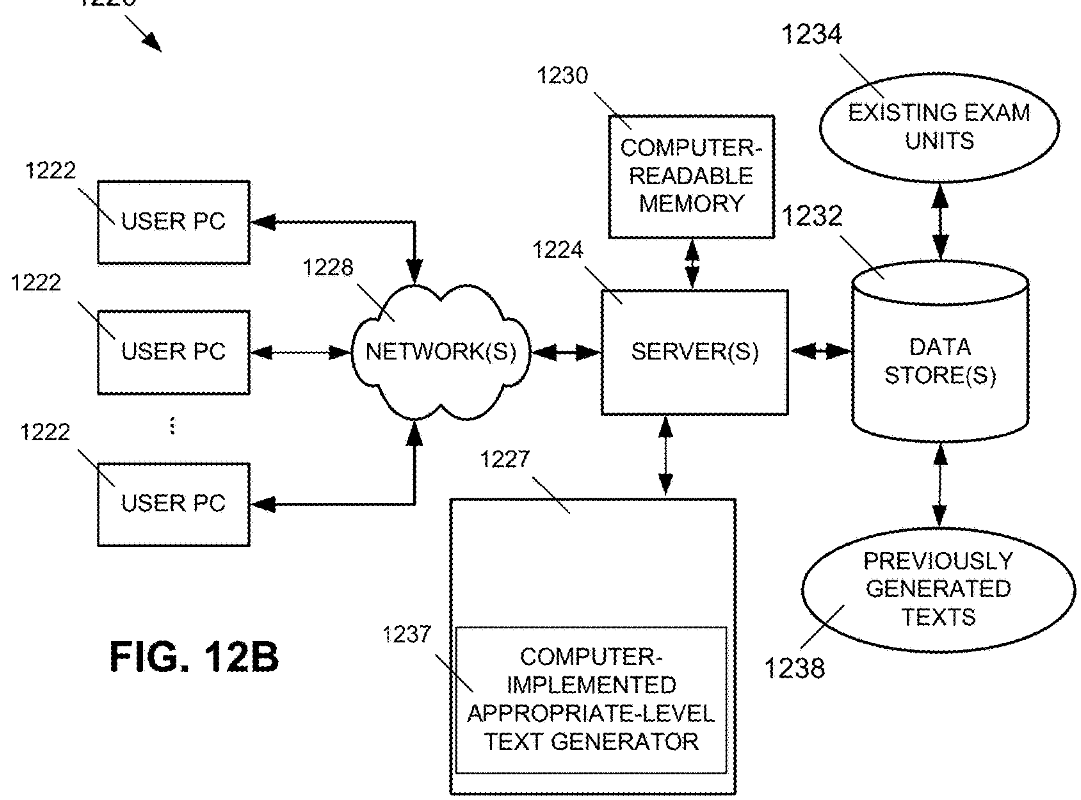
Figure 12C:
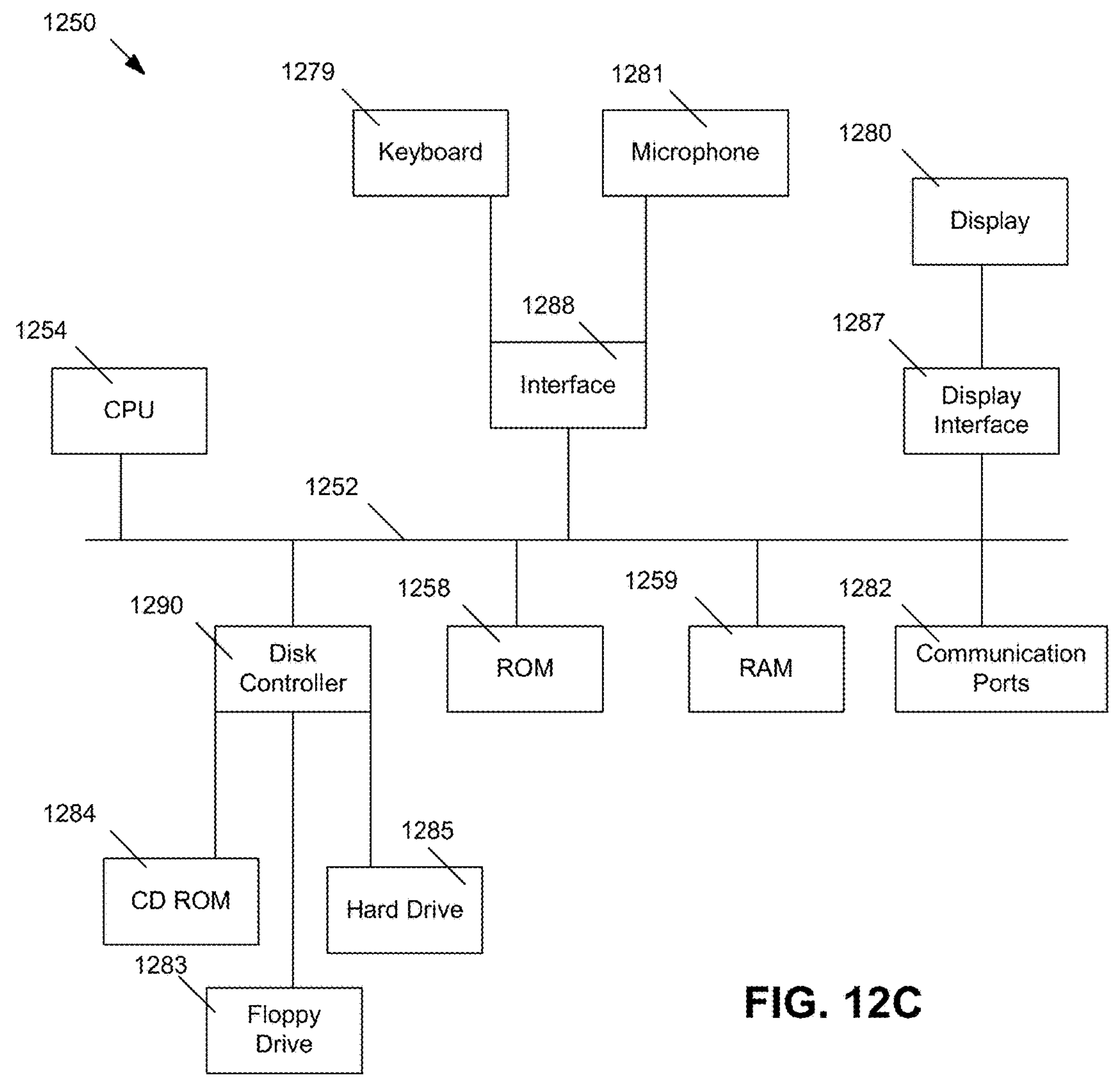

FIGS. 12A, 12B, and 12C depict example systems for implementing the approaches described herein for automatically generating texts appropriate for a reading level of an individual. For example, FIG. 12A depicts an exemplary system 1200 that includes a standalone computer architecture where a processing system 1202 (e.g., one or more computer processors located in a given computer or in multiple computers that may be separate and distinct from one another) includes a computer-implemented appropriate-level text generator 1204 being executed on the processing system 1202. The processing system 1202 has access to a computer-readable memory 1207 in addition to one or more data stores 1208. The one or more data stores 1208 may include existing exam units 1210 as well as previously generated texts 1212. The processing system 1202 may be a distributed parallel computing environment, which may be used to handle very large-scale data sets.

FIG. 12B depicts a system 1220 that includes a client-server architecture. One or more user PCs 1222 access one or more servers 1224 running an appropriate-level text generator 1237 on a processing system 1227 via one or more networks 1228. The one or more servers 1224 may access a computer-readable memory 1230 as well as one or more data stores 1232. The one or more data stores 1232 may include existing exam units 1234 as well as previously generated texts 1238.

FIG. 12C shows a block diagram of exemplary hardware for a standalone computer architecture 1250, such as the architecture depicted in FIG. 12A that may be used to include and/or implement the program instructions of system embodiments of the present disclosure. A bus 1252 may serve as the information highway interconnecting the other illustrated components of the hardware. A processing system 1254 labeled CPU (central processing unit) (e.g., one or more computer processors at a given computer or at multiple computers), may perform calculations and logic operations required to execute a program. A non-transitory processor-readable storage medium, such as read only memory (ROM) 1258 and random access memory (RAM) 1259, may be in communication with the processing system 1254 and may include one or more programming instructions for performing the method of automatically generating texts appropriate for a reading level of an individual. Optionally, program instructions may be stored on a non-transitory computer-readable storage medium such as a magnetic disk, optical disk, recordable memory device, flash memory, or other physical storage medium.

In FIGS. 12A, 12B, and 12C, computer readable memories 1207, 1230, 1258, 1259 or data stores 1208, 1232, 1283, 1284, 1288 may include one or more data structures for storing and associating various data used in the example systems for automatically generating texts appropriate for a reading level of an individual. For example, a data structure stored in any of the aforementioned locations may be used to store data from XML files, initial parameters, and/or data for other variables described herein. A disk controller 1290 interfaces one or more optional disk drives to the system bus 1252. These disk drives may be external or internal floppy disk drives such as 1283, external or internal CD-ROM, CD-R, CD-RW or DVD drives such as 1284, or external or internal hard drives 1285. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1290, the ROM 1258 and/or the RAM 1259. The processor 1254 may access one or more components as required.

A display interface 1287 may permit information from the bus 1252 to be displayed on a display 1280 in audio, graphic, or alphanumeric format. Communication with external devices may optionally occur using various communication ports 1282.

In addition to these computer-type components, the hardware may also include data input devices, such as a keyboard 1279, or other input device 1281, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A processor implemented method of generating texts appropriate for a reading level of an individual, comprising:

accessing a plurality of existing exam units, wherein each of the existing exam units includes a reading passage and a plurality of questions related to the reading passage;

filtering each of the plurality of questions based on a criterion to form a subset of questions for each respective existing exam unit;

determining a text complexity score for each respective existing exam unit based on the reading passage associated with each respective existing exam unit, wherein each text complexity score is determined based on a scoring of features extracted from each associated reading passage by a text difficulty scoring engine;

determining a reading difficulty score for each respective existing exam unit based on the subset of questions associated with each respective existing exam unit;

determining a correlation between each text complexity score and each corresponding reading difficulty score for each respective existing exam unit;

generating a concordance table based on the correlations between the text complexity scores and the reading difficulty scores; receiving an exam score for an individual based on a test other a linking test establishing the individual's reading proficiency;

generating a text that is appropriate for a reading level of the individual using the concordance table, based on the exam score; and displaying the text to the individual.

2. The method of claim 1, wherein generating a text comprises identifying the text based on the text having a third difficulty score that is within a threshold difference of an appropriate text difficulty level.

3. The method of claim 1, wherein the text is selected based on a relationship between the difficulty text complexity score and a third difficulty score associated with the text.

4. The method of claim 3, wherein the third difficulty score is also determined using the text difficulty scoring engine.

5. The method of claim 1, wherein the criterion divides each of the plurality of questions into a text representation group and a response decision group, wherein the filtering chooses questions from the text representation group for the subset of questions.

6. The method of claim 1, wherein a question difficulty level is associated with each of the plurality of questions, wherein the filtering chooses questions having question difficulty levels within a threshold distance of the text complexity score.

7. The method of claim 1, wherein the text complexity score is based on the reading passage alone.

8. The method of claim 1, wherein the reading difficulty score is based on a reading proficiency level that would result in a test taker getting a threshold percentage of the subset of questions correct.

9. The method of claim 8, wherein the threshold is 75%.

10. The method of claim 1, wherein displaying the text comprises providing a link to the text.

11. The method of claim 1, wherein the exam score is based on performance of the individual on a test that includes an exam unit.

12. The method of claim 1, wherein the exam score is based on performance of the individual on multiple exam units.

13. The method of claim 1, wherein the exam score is based on performance of the individual on exactly one test, without incorporation of any linking test results.

14. The method of claim 1, wherein the concordance table maps exam scores to third difficulty scores associated with texts from which the generated text is selected.

15. A system for generating texts appropriate for a reading level of an individual, comprising: one or more data processors; a non-transitory computer-readable medium encoded with instructions for commanding the one or more data processors to execute steps of a process that include:

accessing a plurality of existing exam units, wherein each of the existing exam units includes a reading passage and a plurality of questions related to the reading passage;

filtering each of the plurality of questions based on a criterion to form a subset of questions for each respective existing exam unit;

determining a text complexity score for each respective existing exam unit based on the reading passage associated with each respective existing exam unit, wherein each text complexity score is determined based on a scoring of features extracted from each associated reading passage by a text difficulty scoring engine;

determining a reading difficulty score for each respective existing exam unit based on the subset of questions associated with each respective existing exam unit;

determining a correlation between each text complexity score and each corresponding reading difficulty score for each respective existing exam unit;

generating a concordance table based on the correlations between the text complexity scores and the reading difficulty scores;

receiving an exam score for an individual based on a test other a linking test establishing the individual's reading proficiency;

generating a text that is appropriate for a reading level of the individual using the concordance table, based on the exam score; and displaying the text to the individual.

16. The system of claim 15, wherein generating a text comprises identifying the text based on the text having a third difficulty score that is within a threshold difference of an appropriate text difficulty level.

17. The system of claim 15, wherein the text is selected based on a relationship between the text complexity score and a third difficulty score associated with the text.

18. A non-transitory computer-readable medium encoded with instructions for commanding one or more data processors to execute a method of generating texts appropriate for a reading level of an individual, the method comprising:

accessing a plurality of existing exam units, wherein each of the existing exam units includes a reading passage and a plurality of questions related to the reading passage;

filtering each of the plurality of questions based on a criterion to form a subset of questions for each respective existing exam unit;

determining a text complexity score for each respective existing exam unit based on the reading passage associated with each respective existing exam unit, wherein each text complexity score is determined based on a scoring of features extracted from each associated reading passage by a text difficulty scoring engine;

determining a reading difficulty score for each respective existing exam unit based on the subset of questions associated with each respective existing exam unit;

determining a correlation between each text complexity score and each corresponding reading difficulty score for each respective existing exam unit;

generating a concordance table based on the correlations between the text complexity scores and the reading difficulty scores;

receiving an exam score for an individual based on a test other a linking test establishing the individual's reading proficiency;

generating a text that is appropriate for a reading level of the individual using the concordance table based on the exam score; and displaying the text to the individual.

* * * * *